United States Patent [19]
Harding

[11] Patent Number: 5,918,628
[45] Date of Patent: Jul. 6, 1999

[54] MULTI-STAGE CHECK VALVE

[75] Inventor: Curtis F. Harding, Lyons, N.Y.

[73] Assignee: Parker-Hannifin Corporation, Cleveland, Ohio

[21] Appl. No.: 09/063,704

[22] Filed: Apr. 21, 1998

Related U.S. Application Data

[60] Provisional application No. 60/049,802, Jun. 17, 1997.

[51] Int. Cl.$^6$ ............................. F16K 15/00; F16K 31/12
[52] U.S. Cl. ....................... 137/512.1; 137/497; 137/538
[58] Field of Search ............................... 137/512.1, 497, 137/538

[56] References Cited

U.S. PATENT DOCUMENTS

| | | |
|---|---|---|
| 2,706,490 | 4/1955 | Grieshaber et al. . |
| 2,953,992 | 9/1960 | Bartholomaus et al. . |
| 3,684,186 | 8/1972 | Helmrich ................. 239/400 |
| 3,916,946 | 11/1975 | Motzer .................... 137/538 |
| 3,980,233 | 9/1976 | Simmons et al. ........ 239/400 |
| 3,995,656 | 12/1976 | Mills, Jr. ................ 137/538 |
| 4,524,799 | 6/1985 | Fenne . |
| 4,570,668 | 2/1986 | Burke et al. ........... 137/512.1 |
| 4,682,625 | 7/1987 | Christopher ............. 137/538 |
| 4,756,334 | 7/1988 | Panet et al. . |
| 5,033,506 | 7/1991 | Bofinger et al. . |
| 5,054,518 | 10/1991 | Rancani .................. 137/538 |
| 5,078,324 | 1/1992 | DuBell et al. ........... 239/407 |
| 5,570,580 | 11/1996 | Mains ..................... 239/132.5 |

Primary Examiner—Denise L. Ferensic
Assistant Examiner—Joanne Y. Kim
Attorney, Agent, or Firm—Christopher H. Hunter

[57] ABSTRACT

A check valve includes an outer valve body and an inner poppet valve moveable relative to the valve body and spring-biased into a closed position. The inner poppet valve has first and second stage openings. The first stage preferably has a single, relatively small through-hole into the chamber of the poppet valve, while the second stage preferably has multiple openings of a larger diameter. The first and second stage openings are spaced axially along the poppet valve, with the first stage opening being located closer to the valve head of the poppet valve than the second stage openings. In the closed position, fluid flow is blocked through both the first and second stage openings. When the cracking force of the valve is exceeded and the valve head moves away from the valve seat, fill flow occurs through the first stage opening and is restricted through the second stage openings. The restricted fluid flow causes the pressure drop across the check valve to be satisfactory at low flow rates to cause the poppet valve to stroke long enough such that particles will pass easily between the valve head and the valve seat. The flow increases through the second stage openings as the poppet valve moves toward its open position. The pressure drop is minimized at high flow rates to maximize the efficiency of the check valve. The check valve also has relatively few parts, and can be easily assembled and installed within the housing of a fuel nozzle.

36 Claims, 4 Drawing Sheets

MULTI-STAGE CHECK VALVE

RELATED CASES

The present application claims priority to U.S. Provisional Application Ser. No. 60/049,802, filed Jun. 17, 1997.

FIELD OF THE INVENTION

The present invention relates generally to check valves for fluid lines, and more particularly to check valves for aircraft fuel nozzle assemblies.

BACKGROUND OF THE INVENTION

Check valves are well known for a variety of applications where it is desirable to prevent fluid flow through a fluid line when certain conditions are present. Check valves generally include a circular valve head which is biased, such as by a spring, into a closed position against an annular valve seat. An O-ring or other type of annular resilient gasket can be carried by the valve head or valve seat and provide a fluid-tight seal when these elements are together. The check valve is located within the fluid line with the valve head biased in the upstream direction. Fluid in the fluid line is directed into the inlet side of the check valve against the valve head. Fluid above the cracking force of the spring causes the valve head to move away from the valve seat and allow fluid to flow through the valve to the outlet side of the valve. The flow generally increases as the valve head moves away from the valve seat toward the fully open position. One typical check-valve application is to prevent flow through a fluid line when the pressure of the fluid drops below a certain level, for example during the shut-down of a fluid system. The check valve closes to prevent fluid leakage when the pressure drops below this threshold.

Certain aircraft turbine engines require check valves to control fuel flow from a manifold to the nozzle tip. For example, DuBell, et al., U.S. Pat. No. 5,078,324, which is owned by Parker-Hannifin Corporation, the assignee of the present invention, shows and describes a simple check valve located in the nozzle head of a fuel nozzle assembly for a gas turbine engine. The check valve includes a spring-biased circular valve head at the end of a rod-like poppet valve. The poppet valve is biased by a spring to urge the valve head against the valve seat. The check valve controls the fuel flow through a single fuel conduit in the nozzle stem to the nozzle tip. The check valve remains closed such at low or no-flow conditions (for example at engine shut-down) to prevent fuel leakage through the nozzle. The valve head moves away from the valve seat at higher pressures to allow fuel to flow to the spray nozzle tip and into the combustor chamber for ignition. The nozzle head is typically located exterior to the combustor chamber of the engine to protect the check valve from the extreme operating temperatures.

While the above type of check valve is relatively simple to assemble and install, current check valve designs for aircraft engines include a cylindrical poppet valve which is closely received within the valve body. The valve body is turned-in at the upstream end to form a valve seat, and the poppet valve includes a circular upstream end wall which defines a valve head and is designed to mate with the valve seat. One or more radial through-holes are provided in a single circumferential band around the poppet valve near the valve head to direct fuel passing around the valve head into the inner cavity or chamber of the poppet valve, where the fuel then flows through the outlet opening of the check valve. When the fuel pressure exceeds the cracking force of the valve, the fuel flows between the valve seat and valve head, around the exterior of the poppet valve, and then radially inward through the through-holes and axially out of the chamber. This type of check valve, sometimes referred to as an "over-balance" valve, provides increased force at the open position than at the closed position, which results in increased stroke and reduced pressure drop as compared to the prior designs described above.

Certain fuel nozzles ("dual orifice" nozzles) also include a flow divider valve located in the nozzle head, downstream from the check valve. The flow divider valve divides the fuel flowing from the check valve into a primary and secondary fuel path. The primary and secondary fuel paths are then directed by separate conduits to primary and secondary spray orifices in the fuel nozzle. Such a spray nozzle having primary and secondary fuel conduits to primary and secondary spray orifices is shown in Mains, U.S. Pat. No. 5,570,580, which is also owned by the assignee of the present invention, as well as in Helmrich, U.S. Pat. No. 3,684,186 and Bradley, U.S. Pat. No. 4,600,151. A typical flow divider valve for gas turbine engines is shown and described in Burke, et al., U.S. Pat. No. 4,570,668, which is also owned by the assignee of the present invention. Of course, the above dual orifice fuel nozzle is only an example of one application for a check valve, as check valves are also necessary in some aircraft engines with only a single fuel path to the spray nozzle ("simplex" nozzles), as well as in other aircraft and non-aircraft applications. A known spray nozzle having a single fuel path is shown for example in Simmons et al., U.S. Pat. No. 3,980,233.

One challenge in the aircraft industry has been to provide a check valve for a fuel nozzle assembly which operates over a broad flow range. At low flow levels (low fuel pressure), the check valve should have an adequate stroke to prevent particles from becoming entrapped between the valve head and valve seat. This can impede the sealing capabilities of the check valve and require frequent maintenance and/or replacement of the valve. One technique which has been used is to restrict the flow path across the check valve. The radial through-holes in the poppet valve for example can be made smaller to increase the pressure against the upstream surface of the poppet valve, thereby moving the poppet valve a greater amount at lower fuel flows. However, restricting the flow across the check valve necessarily increases the pressure drop across the valve. This can be unwanted in certain applications, particularly applications which also have high fluid flows (high fuel pressure) under certain operating conditions (e.g., full-throttle). A significant pressure drop can limit fuel flow to the engine and thereby effect engine efficiency. Applicant believes that heretofore the design of the check valve has required somewhat of a compromise between engine efficiency and the stroke of the poppet valve typically finding a balance that does not optimize either of these properties and therefore does not maximize engine performance over a broad flow range.

Applicant further believes that prior check valve designs have often required considerable space in the nozzle assembly and have been fairly heavy. This can increase the material cost of the aircraft and the cost of fuel for operating the aircraft. The check valves are also often complex and time-consuming to assemble, and to install in the nozzle assembly, all of which can add to the over-all cost of manufacturing and maintaining the fuel system, and hence the aircraft. Applicant therefore believes there is a demand in the industry for an improved check valve for a fuel nozzle assembly which operates over a broad flow range, is compact in design, has a reduced weight and is easy to assemble and install, in order to meet the more demanding applications currently required in the aircraft industry.

SUMMARY OF THE INVENTION

The present invention provides a novel check valve, particularly for the fuel nozzle assembly of an aircraft engine, which operates across a broad fluid flow range. The stroke of the poppet valve in the check valve is sufficient to prevent particles from collecting between the valve head and valve seat, even at low flow rates, while the check valve has a design which minimizes the pressure drop across the valve at higher flow rates. The check valve also has few parts which are easy to assemble and install in a fuel nozzle assembly, is compact, and is light-weight in design.

According to the present invention, the check valve includes an outer cylindrical valve body and an inner cylindrical poppet valve, where the inner poppet valve includes first and second stage openings to allow fuel to flow through the poppet valve. The first stage opening is preferably a single, relatively small through-hole, while the second stage preferably has multiple through-holes of a larger diameter. The through-holes in the first and second stages all extend radially through the poppet valve, and the stages are spaced axially along the poppet valve in separate circumferential bands, with the first stage band with the single through-hole being located closer to the valve head than the second stage band with the multiple through-holes.

The first stage band also preferably includes a series of enlarged cavities extending in evenly-spaced relation circumferentially around the poppet valve. The single through-hole of the first stage is located in one of the cavities. An annular clearance is provided between the inner surface of the valve body and the outer diameter of the valve head such that the enlarged cavities are in fluid communication with the inlet fluid opening when the valve head moves out of engagement with the valve seat. The valve body also includes a circumferential groove formed in the inner surface of the body. The circumferential groove is initially axially aligned with the second stage openings in the second stage band, but not with the first stage opening in the first stage band.

When the poppet valve is in the closed position, fluid flow is blocked through the first and second stage openings by virtue of the valve head sealing against the valve seat. When the cracking force of the valve is exceeded and the valve head initially moves away from the valve seat, flow from the inlet fluid opening flows into the cavities in the first stage and through the first stage opening. The fluid flow is generally restricted through the second stage openings, and primarily passes through a small annular clearance provided between the valve head and the valve body to the second stage openings. The circumferential groove in the inner surface of the valve body remains axially aligned with only the second stage openings. The pressure drop across the check valve is satisfactory at low flow rates to cause the poppet valve to stroke sufficiently (and rapidly) such that particles will pass easily between the valve head and the valve seat.

At higher flow rates, as the poppet valve moves toward its open position, the circumferential groove on the inside surface of the valve body also becomes aligned with the enlarged cavities in the first stage, thereby allowing increased fluid flow from the inlet fluid opening through the enlarged cavities to the openings in the second stage band. As the poppet valve moves relative to the valve body, the flow increases across the circumferential groove and through the second stage openings as the groove becomes increasingly aligned with the enlarged cavities. The pressure drop across the check valve at the higher flow rates is minimized, which increases the efficiency of the engine.

The present invention thereby has the advantage of sufficient stroke at low flow rates to prevent particle entrapment in the check valve, and reduced pressure drop at higher flow rates to increase the efficiency of the engine. The check valve also of course provides the usual advantage of an on/off valve, i.e., preventing fluid flow through the fluid line when the pressure falls below the cracking force of the poppet valve The check valve described above has relatively few parts formed from light-weight, high strength material, and can be easily assembled and installed within a nozzle assembly housing. The valve body preferably includes an outer housing and an inner sleeve. The outer housing includes an in-turned lip at the upstream end which defines a valve seat and also prevents the poppet valve from passing through this end of the check valve. The valve sleeve and an O-ring type seal (for sealing against the valve head) are inserted into the outer housing and are carried by the in-turned lip of the housing. The poppet valve, a compression spring for biasing the poppet valve, and an annular shim are then inserted into the housing interior of the valve sleeve and O-ring. The compression spring is located between an inside annular shoulder in the poppet valve and the shim. An annular retaining seat is then inserted into the valve body to support the downstream end of the valve sleeve, poppet valve and shim. An annular retaining ring is then inserted into an annular groove formed on the inside surface of the outer housing to retain the retaining seat, and associated components, within the valve body. The retaining ring can be easily inserted into and removed from the housing for quick inspection and/or replacement of the internal components of the check valve.

The check valve thus assembled can be easily installed within a housing assembly of a fuel nozzle, or in other applications.

Further features and advantages of the present invention will become more apparent upon reviewing the following Detailed Description of the present invention and the appended drawings.

DETAILED DESCRIPTION OF THE PREFERRED EMBODIMENT

Figure 1:
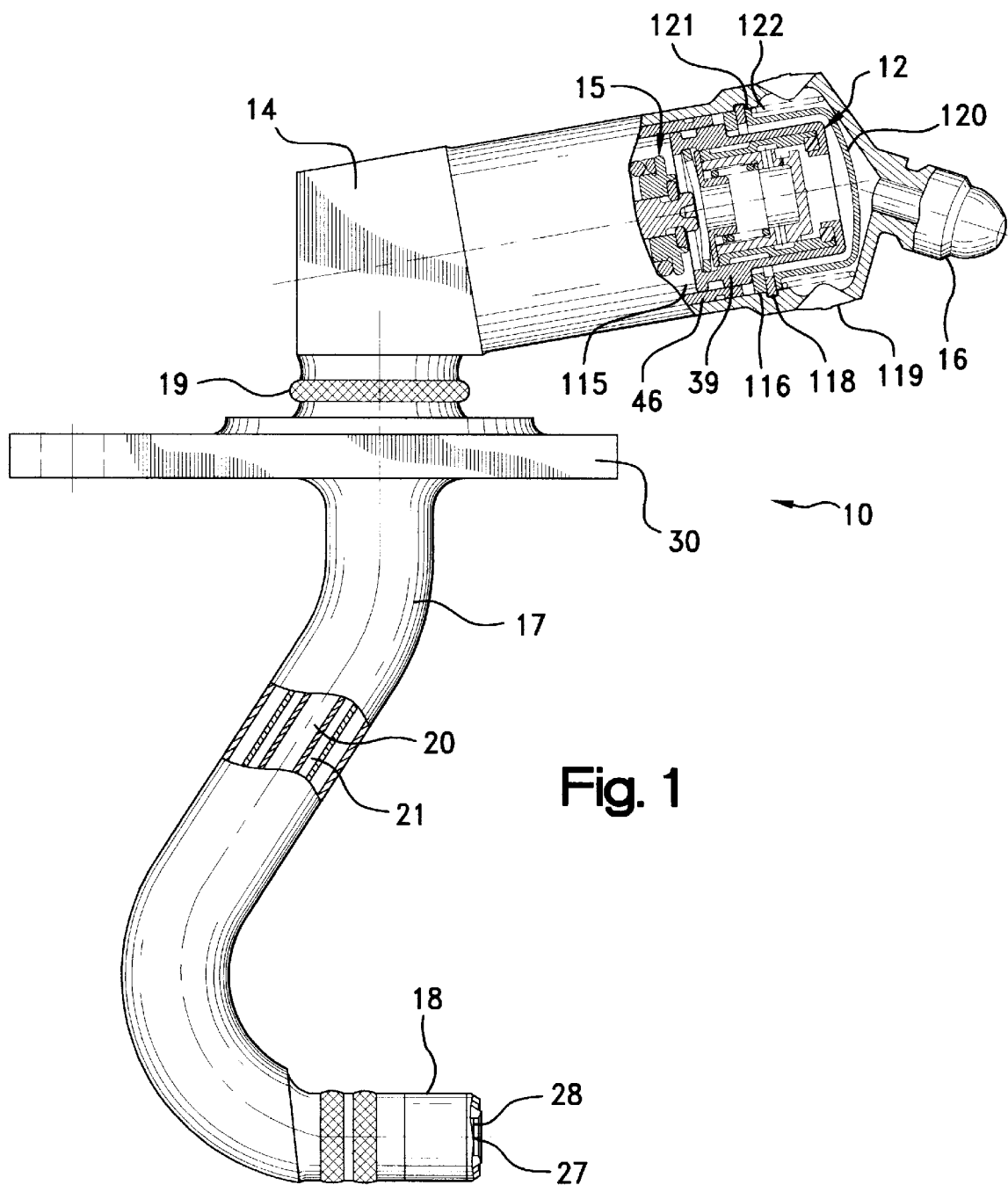
FIG. 1 is a side view of a nozzle assembly with portions shown in cross-section, illustrating a check valve constructed according to the principles of the present invention.

Referring to the drawings, and initially to FIG. 1, a nozzle assembly, indicated generally at 10, is shown including a check valve, indicated generally at 12, constructed according to the principles of the present invention. The nozzle assembly 10 includes an outer housing 14 which encloses the check valve 12 and a flow divider valve, indicated generally at 15. Housing 14 includes a fitting 16 which is connected to and which receives fuel from a fuel manifold (not shown). A stem 17 extends from housing 14 to a spray nozzle or tip 18. Stem 17 can be attached to housing 14, such as by welding at 19, and surrounds primary and secondary fuel conduits 20, 21, with the secondary fuel conduit 21 concentrically surrounding the primary fuel conduit 20. The primary and secondary fuel conduits direct fuel received from the flow divider valve 15 to primary and secondary fuel spray orifices 27, 28 in nozzle 18, which delivers the fuel into a combustor chamber (also not shown) of a gas turbine engine. The nozzle assembly is mounted within an opening in the combustor by an outwardly-extending flange 30 such that the housing 14 (including the check valve 12 and flow divider 15) is supported outside of the combustor chamber, and thus is relatively isolated from the high operating temperatures in the combustor.

The outer housing 14, flow divider 15, stem 17, fuel conduits 20, 21 and spray nozzle 18 are conventional in design and are preferably formed from materials and by using techniques which are known to those skilled in the art. Reference may be had to Mains, U.S. Pat. No. 5,570,580, as well as to Simmons et al., U.S. Pat. No. 3,980,233; Helmrich, U.S. Pat. No. 3,684,186; and Bradley, U.S. Pat. No. 4,600,151, for a general description of fuel conduits and spray nozzles which are useful with the present invention. A typical flow divider valve includes a poppet valve biased by a spring into an upstream position, where the flow path to the primary fuel conduit is normally open and the flow path to the secondary fuel conduit is normally closed. Increasing fuel pressure against the poppet valve gradually opens the valve to also supply fuel to the secondary fuel conduit. Reference may be had to Burke, et al., U.S. Pat. No. 4,570,668 for a general description of a flow divider valve which is useful with the present invention. The check valve of the present invention can of course be used with fuel nozzle assemblies different than those described above. Further, while one application of the present invention is for fuel nozzle assemblies for aircraft engines, and while this is a preferred application, it should be understood that the check valve of the present invention can also be used in other aircraft and non-aircraft applications where it is necessary to control the flow of fluid through a fluid line.

Figure 2:
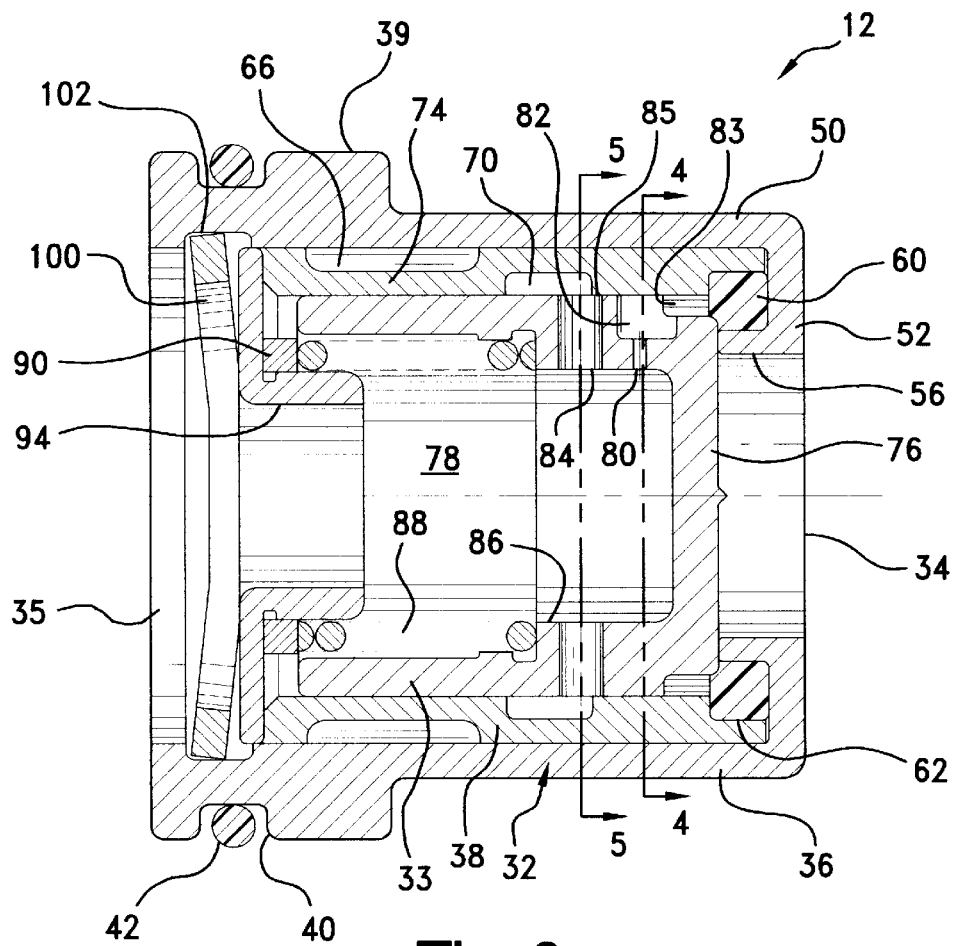
FIG. 2 is an enlarged cross-sectional side view of the check valve shown apart from the nozzle assembly.

Referring now to FIG. 2, the check valve 12 includes an outer valve body, indicated generally at 32, which encloses an inner poppet valve 33. The outer valve body has an upstream end 34 defining an inlet fluid opening, and a downstream end 35 defining an outlet fluid opening. The valve body is preferably formed in two pieces, with an outlet cylindrical valve housing 36 and an inner cylindrical valve sleeve 38, although it is noted that the valve body could also be formed in one piece. In any case, the valve housing 36 has an enlarged band or rib 39 extending circumferentially around the housing adjacent the outer end of the housing. The band includes a circumferential groove or channel 40 carrying a resilient annular gasket 42, such as an elastomeric O-ring type seal. Gasket 42 seals against the inner circumferential surface of an insulation sleeve 46 (FIG. 1) in nozzle housing 14 when the check valve is installed in the housing, as will be described herein in greater detail.

Valve sleeve 38 is fixedly supported within outer check valve housing 36. To this end, housing 36 includes a cylindrical sidewall 50 and a turned-in lip portion at the upstream end of the sidewall. The turned-in lip portion is formed by a radially-inward extending, annular end wall 52 and an inwardly and axially-extending cylindrical wall portion or cuff 56. The annular end wall 52 and cylindrical wall portion 56 of the turned-in lip portion are preferably formed in one piece with cylindrical sidewall 50, using common forming machines and techniques. Cylindrical wall portion 56 defines the inlet fluid opening for the check valve. Valve sleeve 38 is supported and retained at the inlet end of the check valve by a close fitting relationship between the inside surface of sidewall 50, end wall 52 and wall portion 56.

Preferably, although not always necessary depending upon the application, a further resilient annular gasket 60, such as an elastomeric O-ring type seal, is also fixedly supported within the valve body 36. Gasket 60 can be located within a blind circumferential bore 62 formed on the inside surface of valve sleeve 38, adjacent the upstream end of the sleeve, and can fill the clearance between the end of the valve sleeve and the cylindrical wall portion 56. Gasket 60 is closely held between the end of the valve sleeve and the in-turned lip portion, and is compressed when the poppet valve 33 is in a closed position, as will be described herein in more detail. The inner distal end of cylindrical wall portion 56 and gasket 60 define a valve seat which is engaged by the poppet valve, although it is noted that the poppet valve may only engage one of the wall portion 56 or the gasket 60, in which case only one of these components would define the valve seat.

Valve sleeve 38 extends in close fitting relationship with outer check valve housing 36, and has an upstream end supported against the annular end wall 52. The outer surface of sleeve 38 can be machined away, as at 66, for weight reduction. A circumferential groove or channel, indicated at 70, is also formed along the inside surface of sleeve 38 downstream from circumferential bore 62. The function of groove 70 will also be described below.

Figure 3:
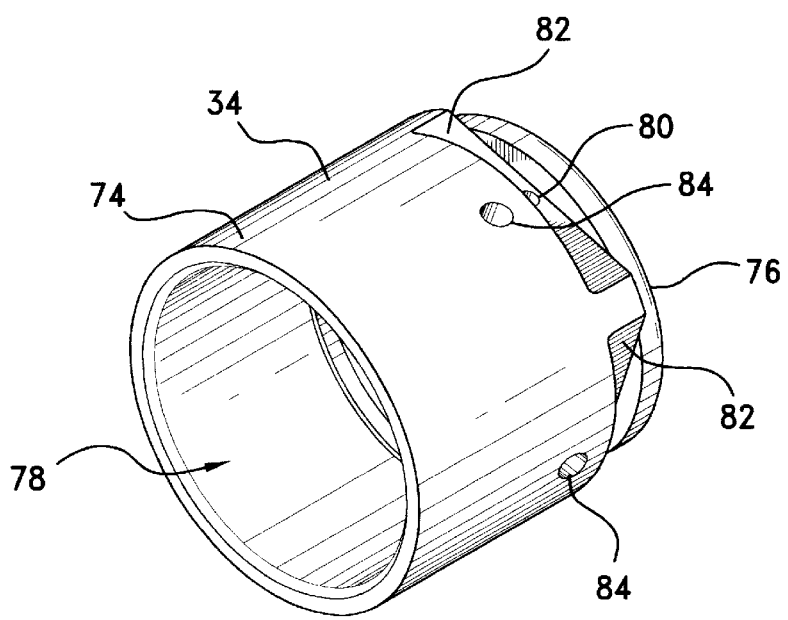
FIG. 3 is an isometric view of the poppet valve for the check valve of FIG. 2.

Poppet valve 33 is closely and slidingly received within the valve sleeve 38. Referring now to FIG. 3, poppet valve 33 is preferably formed in one-piece with a cylindrical sidewall 74 and a solid end wall 76. End wall 76 encloses enclosing the upstream end of the sidewall and together with the sidewall defines an inner chamber or cavity, indicated generally at 78. End wall 76 also defines a valve seat, as will be described herein in more detail.

Figure 4:
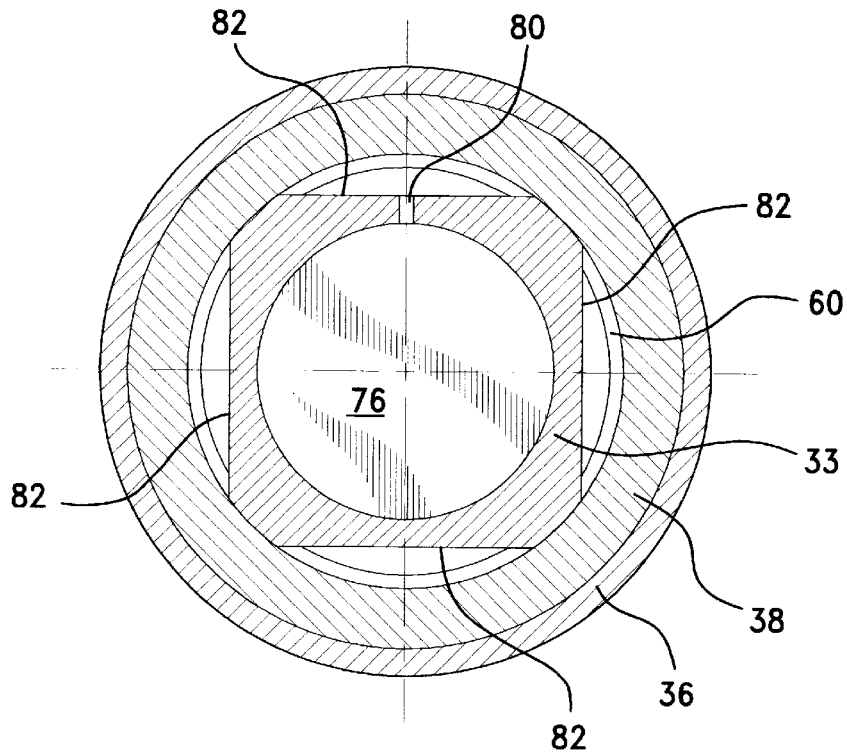
FIG. 4 is cross-sectional end view of the check valve taken substantially along the plane described by the lines 4—4 in FIG. 2.

Poppet valve 33 includes at least two stages, each of which includes means to fluidly interconnect the inlet fluid opening 34 with the poppet valve chamber 78. Referring now to FIGS. 2–4, the first stage preferably includes a single through-hole 80 extending radially through the poppet valve. This stage also includes a series of enlarged cavities, indicated at 82, extending circumferentially around the poppet valve, with the through-hole 80 formed in one of the cavities 82. The enlarged cavities 82 and through-hole 80 are generally located within a first circumferential band defined around the poppet valve proximate the end wall 76. In the illustrated embodiment, four cavities formed by a series of "flats" or secants are provided around the poppet valve in evenly-spaced relation (see e.g., FIGS. 3 and 4). The number, circumferential spacing and dimensions of the cavities can vary, as will be described herein in more detail, as the cavities are primarily designed to provide a flow path to the downstream stage(s). A single annular groove or channel could also be formed around the poppet valve in the first stage, instead of the separate cavities. Further, although the illustrated embodiment shows a single through-hole (FIG. 4), it is pointed out that multiple through-holes could also be provided in the first stage, depending upon the application, as will also be described below.

The enlarged cavities 82 of the first stage are in fluid communication with the inlet fluid opening 34 when the valve head 76 of the poppet valve is not in engagement with (i.e., is spaced away from) the valve seat formed by wall portion 56 and/or gasket 60. Fluid flows around the periphery of the valve head into the enlarged cavities 82, and then through the single through-hole 80 to chamber 78. Preferably valve head 76 has an outer dimension (e.g., an outer diameter) smaller than the inner diameter of the valve sleeve 38 of the valve body, such that a small annular clearance 83 is provided between these components for fluid flow. The fluid flow path could also be formed by other means, such as by groove(s) or channel(s) formed in the outer diameter of the valve head, and in this case the valve head could be closely received within the valve sleeve 38 of the valve body. It is also noted that when the valve head is in engagement with the valve seat, the flow into the enlarged cavities is blocked.

Figure 5:
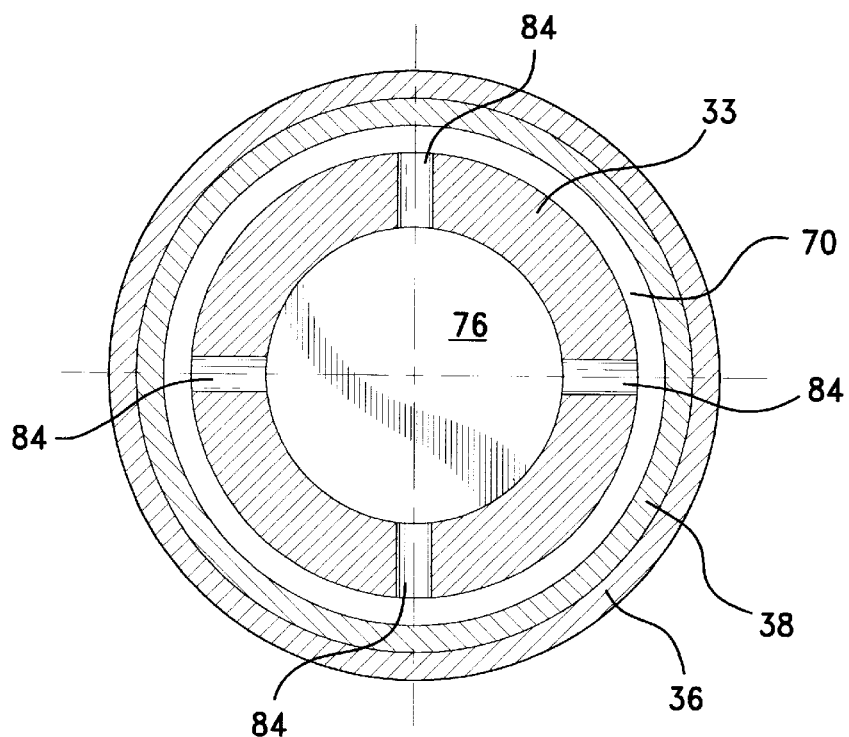
FIG. 5 is a cross-sectional end view of the check valve taken substantially along the plane described by the lines 5—5 in FIG. 2.

As shown in FIGS. 2, 3 and 5, the second stage preferably includes a plurality of through-holes 84, all of which also extend radially through the poppet valve at an axial location spaced downstream from the cavities and through-hole of the first stage. The through-holes 84 are preferably equally-spaced around the poppet valve and are generally located within a second circumferential band defined around the poppet valve downstream and separate from the first band. In the illustrated embodiment, four through-holes are shown for the second stage, however, the number, dimension and circumferential spacing of the through-holes in the second stage can also vary depending upon the particular application, as will also be described herein in more detail. In any case, it is noted that the through-holes in the first and second stages are preferably easily formed in the poppet valve such as by drilling, while the enlarged cavities in the first stage can be formed by machining away appropriate portions of the valve.

The through-holes 84 in the second stage are all initially axially aligned with the circumferential groove 70 in valve sleeve 38, as illustrated in FIG. 2. In this position, the "closed" position, groove 70 is not axially aligned with the enlarged cavities 82 of the first stage. However, a slight annular clearance is provided between the outside diameter of the poppet valve 33 and the inside diameter of the valve sleeve 38, particularly in the circumferential region 85 (FIG. 2) defined between the first stage and the second stage. The fluid flow path through the annular clearance at region 85 is sized to minimize the second stage flow when the valve head initially moves away from the valve seat. A restricted fluid path is thereby provided through the annular clearance from the cavities 82 of the first stage to the through-holes 84 of the second stage when the poppet valve first opens.

Figure 6:
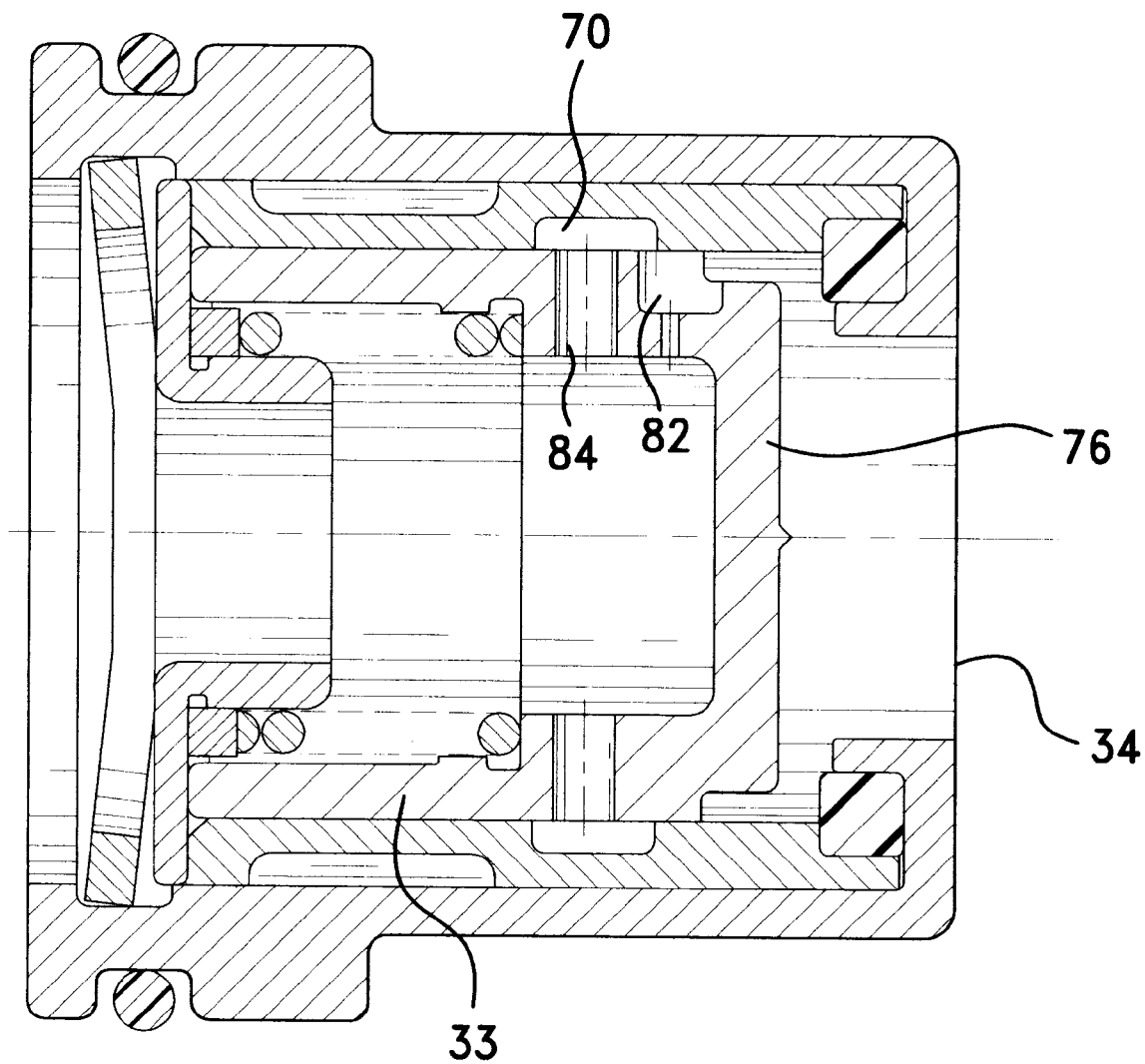
FIG. 6 is an enlarged cross-sectional view similar to FIG. 2, showing the check valve in an open position.

As the poppet valve moves axially relative to the valve body such that valve head moves further away from the valve seat, the enlarged cavities 82 of the first stage become axially aligned with the circumferential groove 70 in the valve sleeve. The axial length of groove 70 is sufficient such that this groove also remains aligned with the through-holes 84 in the second stage, such that fluid flow from the inlet opening 34 into cavities 82 passes through groove 70 to through-holes 84. As the poppet valve moves further axially relative to the valve body, the groove 70 becomes increasingly aligned with cavities 82 and a greater flow path is provided to through-holes 84. FIG. 6 illustrates a position, the "open position", where the valve head 76 of the poppet valve 33 is at a maximum displacement from the valve seat, and the flow path from inlet opening 34 through cavities 82 and groove 70 and into the through-holes 84 is thereby also at a maximum.

Referring again to FIG. 2, the poppet valve 33 further includes a radially-inward extending annular shoulder 86, formed downstream of the first and second stages. Annular shoulder 86 provides an upstream stop surface for a compression spring 88. Compression spring 88 biases the poppet valve toward the closed position, that is toward the inlet opening 34, such that the valve head 76 seats against the valve seat defined by cylindrical wall portion 56 and/or gasket 60. The cooperation of the valve head and valve seat when in the closed position (as illustrated in FIG. 2) provides a fluid-tight seal.

Compression spring 88 is supported on its downstream end by an annular shim 90. The thickness of shim 90 can be varied to change the compression force of the spring, as should be apparent to those skilled in the art. An annular retaining seat 94 is provided proximate the outlet opening 35 of the check valve, against the downstream end of valve sleeve 38 and shim 90. Retaining seat 94 includes an inwardly and axially-extending cylindrical wall portion or cuff 96 which receives and locates the downstream end of spring 88. Seat 94 is in turn held in place by an annular bowed retaining ring 100, which can be fitted into a circumferential groove 102 formed in the inside surface of outer check valve housing 36 toward the outlet opening 35.

Spring 88 urges valve head 76 against the valve seat into the closed position when fluid pressure against the upstream surface of the valve head is below the cracking force of the poppet valve. If gasket 60 is present in the valve seat, the valve head 76 generally compresses this gasket, otherwise, the valve seat seals directly against cylindrical wall portion 56. Flow is thereby prevented through the check valve. At fluid pressures above the cracking force or the poppet valve, the valve head begins to move away from the valve seat, which allows fluid to flow into enlarged cavities 82 and into through-hole 80 to chamber 78. A restricted fluid flow is also provided through the clearance between the poppet valve 33 and the inside surface of the valve sleeve to through-holes 84 and then to chamber 78. The pressure is applied across the entire diameter of the poppet valve, which causes the valve to rapidly move axially ("stroke") with respect to the valve body. Further increases in fluid pressure against the valve head cause increased movement of the poppet valve relative to the valve body and increased flow through the check valve. The increased flow minimizes the pressure drop across the check valve to increase the efficiency of the engine.

By dimensioning the flow path into the poppet valve chamber when the valve initially moves from the closed position to the open position, the stroke of the poppet valve can be selected to be large enough to compensate for the anticipated dimensions of contaminating particles passing through the check valve. The stroke can be set so that these particles do not interfere with the operation of the check valve, for example at a steady-state condition such as during engine "cruise". The dimensions of the annular clearance 83 between the valve head and the valve body, the size, number and dimensions of through-hole 80, enlarged cavities 82, the clearance between the poppet valve and the valve body at 85, and the number, dimension of the through-holes 84 determines the fluid flow into the chamber, the pressure drop, and consequently the stroke of the poppet valve at a particular flow rate. It has generally been determined that only a single, relatively small through-hole is necessary in the first stage to achieve sufficient and rapid stroke at low flow rates, while multiple through-holes of a larger diameter are desirable in the second stage to minimize the pressure drop across the check valve at greater flow rates, although again, the number and dimensions of the through-holes can change depending upon the particular application.

As the poppet valve moves toward its open position, the flow rate increases as groove 70 becomes aligned with both the enlarged openings 82 of the first stage and the through-holes 84 of the second stage. The increase in fluid flow versus the pressure drop across the valve can be adjusted by changing the location and dimensions of the groove 70, as well as the number and dimensions of the through-holes (particularly through-holes 84). It has been found that over a thirty-fold decrease in pressure drop across the check valve can be achieved using a poppet valve with the two stages as described above, which is believed sufficient for a wide variety of applications. It is also anticipated that more than two stages could be used, if a further increase in fluid flow across the valve at even higher rates is desirable. The additional stage(s) could be formed generally following the teachings above.

The check valve described above can be easily assembled. The valve sleeve 38 with (or without) gasket 60 is first installed within the outer check valve housing 36, with the upstream end of the sleeve 38 (and gasket 60) abutting the inside surface of end wall 52, and closely held between the outer sidewall 50 and inner cylindrical wall portion 56. Next, the poppet valve 33 is introduced into the valve body until valve head 76 seats against the valve seat defined by wall portion 56 and/or gasket 60. The wall portion 56 prevents the poppet valve from passing through the inlet opening 34.

Compression spring 88 is then introduced interior to poppet valve 33, and shim 90 is located around the downstream end of the spring. Retaining seat 94 is then located against the components interior to the valve body, and the retaining ring 100 is fitted into groove 102, to hold the interior components securely within the valve body. It is preferred that the retaining ring 100 can be easily removed to inspect and/or replace the interior components of the valve body.

When it is desirable to install the check valve within the nozzle housing 14, the gasket 42 can be located in groove 40, and the check valve can be slid into the housing 14 from the upstream end (see FIG. 1). The downstream (outlet) end of the check valve abuts the end of a hold-down sleeve 115 within the nozzle housing and is closely received within insulation sleeve 46, with gasket 42 sealing against the inside surface of the sleeve. An annular shim 116 can then be located against the upstream surface of the enlarged band 39 and an annular retaining ring 118, such as a spring washer, can then be located in a circumferential groove formed in the inner surface of housing 14 to retain the check valve within the nozzle housing. The inlet fitting 26 can be a separate piece which is then welded at its cylindrical downstream opening to the cylindrical upstream opening of housing 14, such as at 119.

If necessary or desirable, a filter screen 120 can be located upstream of the check valve. Filter screen 120 has a cup-shaped design which is generally fitted over the inlet end of the check valve. The edges of the filter screen around the opening can be formed radially outward to form an annular lip 121. A compression spring 122 can be disposed between the annular lip 121 and the inside surface of the fitting 16 to urge the annular lip against retaining ring 118 and retain the screen 120 in the housing 14. The filter screen mesh size is preferably chosen to be slightly smaller than the distance between the valve head and valve seat at a steady-state condition, for example during engine "cruise", so that any particles passing through the filter screen will also pass through (rather than being trapped in) the check valve.

The check valve 12 can also easily be removed from housing 14 for inspection or replacement, by removing weld 108 and reversing the above steps.

The various components of the check valve 12 are preferably formed of conventional materials using conventional techniques and machines. The materials should generally be light-weight and high-strength to provide long operational life, for example light-weight, high-strength stainless steel. This type of material is generally accepted for and is appropriate for many of the check valve components in a gas turbine engine, but of course can vary depending upon the particular application. The components can generally be formed using common forming machines and presses.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A check valve assembly, comprising:

a valve body having a sidewall with a cylindrical inner surface and with an inlet fluid opening at one end of the valve body and an outlet fluid opening at another end of the valve body, said fluid inlet opening of said valve body defining a valve seat;

a poppet valve having a sidewall with a cylindrical outer surface in surface-to-surface sliding relationship with the inner surface of the valve body, and an end wall enclosing one end of the poppet valve and defining a valve head, the poppet valve sidewall and end wall defining an inner chamber, the inner chamber being in fluid communication with the outlet fluid opening of the valve body;

a biasing device disposed within said valve body urging said poppet valve in a first axial direction toward a closed position where said valve head of said poppet valve sealingly mates with said valve seat of said valve body to prevent fluid flow through the inlet fluid opening of the valve body, said poppet valve capable of being moved in a second axial direction, opposite from said first direction, into an open position to move the valve head out of sealing engagement with said valve seat and allow fluid to flow through the inlet fluid opening;

said poppet valve further including first and second stages with openings through the poppet valve, a first stage opening separate from a second stage opening and disposed along said poppet valve axially closer to said valve head than said second stage opening, said valve body and poppet valve cooperating to provide a fluid flow path between said poppet valve and said valve sleeve and through both said first and second stage openings to fluidly connect said inlet fluid opening and said chamber of the poppet valve when said poppet valve is in the open position, said valve body and poppet valve cooperating to block the fluid flow path through the first and second stage openings to the poppet valve chamber when said poppet valve is in the closed position, and said valve body and poppet valve cooperating to provide a flow path through the first stage opening and to restrict the flow path through the second stage opening when the poppet valve initially moves in said second direction from said closed position, and then after a predetermined axial movement of the poppet valve relative to the valve body toward said open position, increasing the flow path to the second stage opening.

2. The check valve assembly as in claim 1, wherein the pressure drop of fluid across the check valve decreases when the valve head initially moves away from the valve seat and the flow path is restricted to the second stage opening, and is minimized as the flow path increases to the second stage opening as the poppet valve moves axially toward the open position.

3. The check valve assembly as in claim 1, wherein said first and second stage openings are each formed in the sidewall of the poppet valve.

4. The check valve assembly as in claim 3, wherein said first and second stage openings each extend radially inward through the poppet valve.

5. The check valve assembly as in claim 1, wherein said valve head includes an outer dimension which is less than an inner dimension of the valve body to define the flow path between the valve body and the poppet valve.

6. The check valve assembly as in claim 1, wherein the first stage includes an enlarged cavity formed in the outer surface of the poppet valve and a smaller through-hole from the enlarged cavity into the chamber of the poppet valve, the cavity being fluidly interconnected with the inlet flow opening of the valve body by the flow path when said poppet valve is in the open position, and blocked when the poppet valve is in the closed position.

7. The check valve as in claim 6, wherein said first stage includes a plurality of enlarged cavities spaced evenly around the outer surface of the poppet valve in a circumferential band, each of said cavities being fluidly interconnected with the inlet flow opening of the valve body by the flow path when said poppet valve is in the open position, and blocked when the poppet valve is in the closed position.

8. The check valve assembly as in claim 1, further including a plurality of second stage openings, separate from the first stage opening and axially spaced farther from the valve head than the first stage opening.

9. The check valve assembly as in claim 1, wherein said valve body includes a turned-in lip portion at the inlet fluid opening end of the valve body, said turned-in lip portion forming the valve seat for the poppet valve.

10. The check valve assembly as in claim 9, further including a resilient annular gasket disposed within said valve body and bounding the inside surface of the valve body around the inlet fluid opening, said gasket sealing against the valve head of the poppet valve when said poppet valve is in the closed position, said turned-in lip portion surrounding a portion of the gasket and retaining and supporting the gasket on said valve body.

11. The check valve assembly as in claim 1, wherein said valve body includes an outer cylindrical housing and an inner cylindrical sleeve fixed to the valve body, both of which are disposed around said poppet valve.

12. The check valve assembly as in claim 11, wherein said inner sleeve includes a annular groove along an inside surface of the sleeve, said groove normally aligned only with said second stage opening when said poppet valve is in said closed position, and aligned with both said first and second stage openings when said poppet valve is in said open position to fluidly interconnect said first and second stage openings.

13. The check valve assembly as in claim 1, wherein said biasing device comprises a compression spring disposed inwardly of said valve body and extending between an annular stop on one end of the valve body and an annular inner shoulder of said poppet valve to bias said poppet valve to said open position.

14. The check valve assembly as in claim 13, further including an annular shim disposed between said stop and said spring.

15. The check valve assembly as in claim 1, wherein the first stage opening is smaller than the second stage opening.

16. The check valve assembly as in claim 1, wherein said valve head of said poppet valve is imperforate.

17. A check valve assembly, comprising:

a valve body having a sidewall with a cylindrical inner surface and with an inlet fluid opening at one end of the valve body and an outlet fluid opening at another end of the valve body, said fluid inlet opening of said valve body defining a valve seat;

a poppet valve having a sidewall with a cylindrical outer surface in surface-to-surface sliding relationship with the inner surface of the valve body, and an end wall enclosing one end of the poppet valve and defining a valve head, the poppet valve sidewall and end wall defining an inner chamber, the inner chamber being in fluid communication with the outlet fluid opening of the valve body;

a biasing device disposed within said valve body urging said poppet valve in a first axial direction toward a closed position where said valve head of said poppet valve sealingly mates with said valve seat of said valve body to prevent fluid flow through the inlet fluid opening of the valve body, said poppet valve capable of being moved in a second axial direction, opposite from said first direction, into an open position to move the valve head out of sealing engagement with said valve seat and allow fluid to flow through the inlet fluid opening;

said poppet valve further including first and second stages with openings through the poppet valve, a first stage opening separate from a second stage opening and disposed along said poppet valve axially closer to said valve head than said second stage opening, said valve body and poppet valve cooperating to provide a fluid flow path between said poppet valve and said valve sleeve and through both said first and second stage openings to fluidly connect said inlet fluid opening and said chamber of the poppet valve when said poppet valve is in the open position, said valve body and poppet valve having cooperating structure to block the fluid flow path through the first and second stage openings to the poppet valve chamber when said poppet valve is in the closed position, and to increase the flow path through the first and second stage openings as the poppet valve moves from its closed position to its open position, the, increasing flow path minimizing the pressure drop across the check valve as the poppet valve moves from the closed position to the open position.

18. The check valve assembly as in claim 17, wherein said first stage opening is relatively smaller than said second stage opening.

19. The check valve assembly as in claim 17, wherein said first stage includes a first fluid flow path through the poppet valve into the chamber of the poppet valve and the second stage includes a second flow path through the poppet valve into the chamber of the poppet valve, the first flow path in the first stage being relatively smaller than the second flow path in the second stage.

20. The check valve assembly as in claim 17, wherein said cooperating structure includes means for restricting the fluid flow path to said second stage opening when said poppet valve initially moves from the closed position to the open position.

21. The check valve assembly as in claim 17, wherein said cooperating structure includes means in said valve body for increasing the fluid flow path to said second stage opening as the poppet valve moves from its closed position to its open position.

22. A fuel nozzle assembly, comprising:
a nozzle housing having an inlet port and an outlet port;
a check valve disposed within said housing to regulate fuel flow between said inlet port and said outlet port, said check valve including a valve body having a sidewall with a inner surface and with an inlet fluid opening at one end of the valve body to receive fuel from said inlet port, and an outlet fluid opening at another end of the valve body to provide fuel to said outlet port, said fluid inlet opening of said valve body defining a valve seat;
a poppet valve having a sidewall with an outer surface in surface-to-surface sliding relationship with the inner surface of the valve body, and an end wall enclosing one end of the poppet valve and defining a valve head, the poppet valve sidewall and end wall defining an inner chamber, the inner chamber being in fluid communication with the outlet fluid opening of the valve body to the outlet port of the nozzle housing;
a biasing device disposed within said valve body urging said poppet valve in a first axial direction toward a closed position where said valve head of said poppet valve sealingly mates with said valve seat of said valve body to prevent fluid flow from the inlet port through the inlet fluid opening of the valve body, said poppet valve capable of being moved in a second axial direction, opposite from said first direction, into an open position to move the valve head out of sealing engagement with said valve seat and allow fluid to flow through the inlet fluid opening to the outlet port, the movement of the poppet valve relative to the valve body determined by fuel pressure through the inlet port, with increasing pressure causing the valve head of the poppet valve to move further away from the valve seat of the valve body;
said poppet valve further including first and second stage openings through the poppet valve, said first stage opening separate from the second stage opening and disposed along said poppet valve axially closer to said valve head than said second stage opening, a fluid flow path between said poppet valve and said valve sleeve and through both said first and second stage openings to fluidly connect said inlet fluid opening and said chamber of the poppet valve when said poppet valve is in the open position,
said valve head and valve seat blocking the fluid flow path through the first and second stage openings to the poppet valve chamber when said poppet valve is in the closed position, and
said valve body and poppet valve cooperating to restrict the flow path when said poppet valve initially moves in said second direction from said closed position to allow fluid to flow through the first stage opening into the chamber of the poppet valve and blocking the second stage opening, and then after a predetermined axial movement of the poppet valve relative to the valve body toward the open position, increasing the flow path to gradually allow fluid to flow also through the second stage opening depending upon the axial location of the poppet valve relative to the valve body.

23. The fuel nozzle assembly as in claim 22, further including means for restricting the fluid flow through the second stage opening into the chamber of the poppet valve when the poppet valve initially moves from the closed position to the open position, and then for increasing the fluid flow path when the poppet valve moves further toward the open position.

24. A check valve assembly, comprising:
a valve body having a sidewall with a cylindrical inner surface and with an inlet fluid opening at one end of the valve body and an outlet fluid opening at another end of the valve body, said valve body having an in-turned lip portion at the one end of the valve body defining a valve seat;
a poppet valve disposed within said valve body and having a sidewall with a cylindrical outer surface in surface-to-surface sliding relationship with the inner surface of the valve body, and an end wall fluidly enclosing one end of the poppet valve and defining a valve head, the poppet valve sidewall and end wall defining an inner chamber, the inner chamber being in fluid communication with the outlet fluid opening of the valve body;
said in-turned lip portion of said valve body cooperating with said poppet valve to prevent said poppet valve from passing through the inlet fluid opening, and a retaining device fixable to said valve body and cooperating with the poppet valve to prevent the poppet valve from passing through the outlet fluid opening,
a first resilient annular gasket carried by said turned in lip portion of said valve body and bounding the fluid inlet opening;
a biasing device disposed within said valve body between said retaining device and said valve head urging said poppet valve in a first axial direction toward a closed position where said valve head of the poppet valve sealingly mates with said valve seat of said valve body to prevent fluid flow through the inlet fluid opening of the valve body, said poppet valve capable of being moved in a second axial direction, opposite from said first direction, into an open position to move the valve head out of sealing engagement with said valve seat and allow fluid to flow through the inlet fluid opening;
said poppet valve further including through-openings through the sidewall of the poppet valve, said valve body and poppet valve cooperating to provide a fluid flow path between said poppet valve and said valve sleeve and through said openings to fluidly connect said inlet fluid opening and said chamber of the poppet valve when said poppet valve is in the open position,
said valve body and poppet valve cooperating to block the fluid flow path through the openings to the chamber when said poppet valve is in the closed position.

25. The check valve assembly as in claim 24, wherein said valve body includes an annular groove on an outer surface thereof, and a second resilient annular gasket is disposed within said annular groove.

26. The check valve assembly as in claim 24, wherein the retaining device comprises a retaining ring, and said valve body includes an annular groove on the inside surface thereof proximate said outlet fluid opening receiving said retaining ring.

27. The check valve assembly as in claim 24, further including an annular shim disposed between said retaining device and said biasing device.

28. The check valve assembly as in claim 24, wherein said valve body includes an outer housing and an inner valve sleeve which both surround the poppet valve, the outer valve housing including a cylindrical sidewall and the in-turned lip portion at the inlet fluid opening carrying the annular gasket and bounding the one end of the valve sleeve, said retaining device bounding the other end of the valve sleeve to fix the valve sleeve relative to the outer housing.

29. The check valve assembly as in claim 28, wherein said in-turned lip portion includes a radially-extending annular end wall portion bounding the end of the valve sleeve and carrying the annular gasket, and an inner axial portion bounding the inner periphery of the end wall portion and extending axially inward along a portion of the valve body, an end of said valve sleeve and said gasket being disposed between said sidewall of said outer housing and said inner axial portion of said in-turned lip portion.

30. The check valve assembly as in claim 29, wherein said valve sleeve includes an annular, inwardly-facing counterbore proximate an end of the valve sleeve adjacent the in-turned lip portion of the outer housing, said gasket being received within said annular counterbore.

31. The check valve assembly as in claim 24, wherein said valve head includes an outer dimension which is less than an inner dimension of the valve body to define the flow path between the valve body and the poppet valve.

32. The check valve assembly as in claim 24, wherein the poppet valve includes an enlarged cavity formed in the outer surface of the poppet valve and a smaller through-hole into the chamber of the poppet valve, the cavity being fluidly interconnected with the inlet flow opening of the valve body by the flow path when said poppet valve is in the open position, and blocked when the poppet valve is in the closed position.

33. The check valve as in claim 32, wherein said poppet valve includes a plurality of enlarged cavities spaced evenly around the outer surface of the poppet valve in a circumferential band, each of said cavities being fluidly interconnected with the inlet flow opening of the valve body by the flow path when said poppet valve is in the open position, and blocked when the poppet valve is in the closed position.

34. The check valve assembly as in claim 33, wherein said valve body includes a annular groove along the inside surface of the body, said groove normally not axially aligned with said cavities when said poppet valve is in said closed position, and axially aligned with said cavities when said poppet valve is in said open position.

35. The check valve assembly as in claim 24, wherein said biasing device comprises a compression spring disposed inwardly of said valve body and extending between the retaining device and an annular inner shoulder of said poppet valve to bias said poppet valve to the open position.

36. The check valve as in claim 24, wherein said through-holes are formed in the outer surface of the poppet valve in two circumferential bands surrounding the poppet valve, one of said bands being closer to the valve head than the other of said bands, the axial movement of poppet valve relative to the valve body varying the fluid flow path through the through-holes in the one band relative to the through-holes in the other band.

\* \* \* \* \*